United States Patent
Jin et al.

(10) Patent No.: US 9,413,515 B2
(45) Date of Patent: Aug. 9, 2016

(54) MOBILE TERMINAL AND METHOD FOR SELECTING NETWORK

(71) Applicant: Spreadtrum Communications (Shanghai) Co., Ltd., Shanghai (CN)

(72) Inventors: Yi Jin, Shanghai (CN); Xianliang Chen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/238,133

(22) PCT Filed: Dec. 31, 2012

(86) PCT No.: PCT/CN2012/088064
§ 371 (c)(1),
(2) Date: Feb. 10, 2014

(87) PCT Pub. No.: WO2014/101194
PCT Pub. Date: Jul. 3, 2014

(65) Prior Publication Data
US 2015/0295696 A1    Oct. 15, 2015

(51) Int. Cl.
*H04L 5/14* (2006.01)
*H04W 48/16* (2009.01)
(Continued)

(52) U.S. Cl.
CPC .............. *H04L 5/14* (2013.01); *H04B 1/3816* (2013.01); *H04W 48/16* (2013.01); *H04W 48/18* (2013.01);
(Continued)

(58) Field of Classification Search
CPC ....... H04L 5/14; H04B 1/3816; H04W 48/16; H04W 48/18; H04W 48/20; H04W 84/02; H04W 88/06
IPC .......................................................... H04L 5/14
See application file for complete search history.

(56) References Cited

U.S. PATENT DOCUMENTS

2004/0058679 A1* 3/2004 Dillinger ............... H04W 48/16
455/439
2008/0182615 A1* 7/2008 Xue ....................... H04W 48/16
455/552.1

(Continued)

FOREIGN PATENT DOCUMENTS

CN       1822697 A       8/2006
CN       1874591 A       12/2006

(Continued)

OTHER PUBLICATIONS

International Search Report for International Application No. PCT/CN2012/088064, mailed Sep. 26, 2013.

(Continued)

*Primary Examiner* — Paul H Masur
(74) *Attorney, Agent, or Firm* — Cantor Colburn LLP

(57) ABSTRACT

A method for selecting a network, including: selecting, from a Public Land Mobile Network (PLMN) list of a mobile terminal, a PLMN and a corresponding Radio Access Technology (RAT) type, and performing network selection, wherein the PLMN list contains a PLMN number and a RAT type corresponding to the PLMN. The network selection may include: searching in a comparison table if the selected RAT type corresponding to the PLMN is supported by the mobile terminal, wherein the comparison table contains a PLMN number, a RAT type corresponding to the PLMN, and a duplex mode corresponding to the PLMN and the RAT type; and selecting a network according to a duplex mode which corresponds to the selected PLMN and the selected RAT type, if the selected PLMN and the selected RAT type are contained in the comparison table. The speed of network selection is increased greatly, and power consumption is lowered.

17 Claims, 3 Drawing Sheets

(51) Int. Cl.
*H04W 48/18* (2009.01)
*H04W 48/20* (2009.01)
*H04B 1/3816* (2015.01)
*H04W 8/18* (2009.01)
*H04W 88/06* (2009.01)
*H04W 84/04* (2009.01)

(52) U.S. Cl.
CPC ............... *H04W 48/20* (2013.01); *H04W 8/18* (2013.01); *H04W 84/042* (2013.01); *H04W 88/06* (2013.01); *Y02B 60/50* (2013.01)

(56) References Cited

U.S. PATENT DOCUMENTS

| | | |
|---|---|---|
| 2008/0200169 A1 | 8/2008 | Gao |
| 2010/0015978 A1 | 1/2010 | Yoon et al. |
| 2011/0021195 A1* | 1/2011 | Cormier ................ H04W 48/18 455/435.2 |
| 2012/0218922 A1 | 8/2012 | Klingenbrunn et al. |
| 2012/0309391 A1* | 12/2012 | Zhang .................... H04W 48/16 455/432.1 |
| 2013/0109377 A1* | 5/2013 | Al-Khudairi ......... H04W 48/16 455/432.1 |
| 2013/0231105 A1* | 9/2013 | Bai ....................... H04W 48/18 455/426.1 |

FOREIGN PATENT DOCUMENTS

| | | |
|---|---|---|
| EP | 2282586 A1 | 2/2011 |
| WO | 2011068557 A1 | 6/2011 |

OTHER PUBLICATIONS

Extended European Search Report for Application No. 13199800.7-1854, dated Apr. 2, 2014.

* cited by examiner

MOBILE TERMINAL AND METHOD FOR SELECTING NETWORK

CROSS REFERENCE TO RELATED APPLICATION

This is the U.S. national stage of application No. PCT/CN2012/088064, filed on 31 Dec. 2012, the disclosure of which is also incorporated herein by reference.

TECHNICAL FIELD

The present disclosure generally relates to mobile communication technology, and more particularly, to a mobile terminal and a method for selecting a network using the same.

BACKGROUND

With the development of mobile communication technology, network coverage tends to be more complicated and diversified, such as the second Generation (2G) and the third Generation (3G) networks, in which UMTS Terristrial Access Network (UTRAN) is employed as Radio Access Technology (RAT), and Long Term Evolution (LTE) network, in which Evolved UMTS Terristrial Access Network (E-UTRAN) is employed as RAT. To ensure that users can enjoy conveniences of mobile communication technology at any time, a multi-mode mobile terminal which supports multiple networks has been developed. For a 2G/3G multi-mode mobile terminal, it can switch to the 2G network in the event that the 3G network experiences poor coverage, so that basic speech communication can be guaranteed. Alternatively, it can switch back to the 3G network in the event that the 3G network is in good coverage.

Typically, before conducting various services, a mobile terminal needs to search for an available network and registered with the network, for example, the network selection needs to be performed firstly when the mobile terminal is powered on, roaming, or lost in network coverage, so as to camp on the selected network. Currently, a list of Public Land Mobile Network (PLMN) sorted by priority may be stored in a Subscriber Identity Module (SIM) card, an Universal Subscriber Identity Module (USIM) card, or a Nonvolatile Memory (NVM) of a mobile terminal. Each item in the list may further contain a RAT type corresponding to a PLMN. In the event that a mobile terminal is powered on, roaming, or lost in network coverage, the mobile terminal may select a PLMN having the highest priority in the list; and, if the network selection fails, the mobile terminal may select a PLMN having the second highest priority in the list, until the network selection succeeds.

The conventional PLMN list only contains a PLMN and a RAT type corresponding to the PLMN. However, it fails to declare which duplex mode can be used by the PLMN. It is known that a duplex mode may be a Time Division Duplex (TDD) mode or a Frequency Division Duplex (FDD) mode. For example, Time Division-Synchronous Code Division Multiple Access (TD-SCDMA) or Time Division Duplexing Long Time Evolution (TDD-LTE) is a TDD mode, and Wide-Band Code Division Multiple Access (WCDMA) or Frequency Division Duplexing Long Time Evolution (FDD-LTE) is a FDD mode. For a multi-mode mobile terminal supporting both FDD and TDD, because a duplex mode is not specified in the conventional list, the mobile terminal may have to try both of the FDD and TDD modes so as to determine which duplex mode can be used to select the PLMN. In practice, for a given PLMN in a specified location, the PLMN supports only one duplex mode. Even if a network provided by a network operator supports both FDD and TDD, only one duplex mode is supported by the network on a certain network coverage spot. Therefore, for a mobile terminal supporting two duplex modes, problems may occur when network selection is performed according to the two duplex modes, such as the speed of network selection is lowered, and power consumption is increased. More information may refer to U.S. application No. US 20100015978A1, which discloses a method for selecting a preferred network for a multi-mode mobile terminal by using a PLMN list containing disparate groups of radio access technologies. However, this method fails to solve problems of quick network selection for a mobile terminal supporting multiple duplex modes.

SUMMARY

Embodiments of the present disclosure provide a mobile terminal and a method for selecting a network using the same, so that a mobile terminal supporting multiple duplex modes can select a network fast.

One embodiment provides a method for selecting a network, which may include:
 selecting, from a Public Land Mobile Network (PLMN) list of a mobile terminal, a PLMN and a corresponding Radio Access Technology (RAT) type, and performing network selection, wherein the PLMN list contains a PLMN number and a RAT type corresponding to the PLMN;
 wherein the network selection comprises:
 searching in a comparison table if the selected RAT type corresponding to the PLMN is supported by the mobile terminal, wherein the comparison table contains a PLMN number, a RAT type corresponding to the PLMN, and a duplex mode corresponding to the PLMN and the RAT type; and
 selecting a network according to a duplex mode which corresponds to the selected PLMN and the selected RAT type, if the selected PLMN and the selected RAT type are contained in the comparison table.

In some embodiments, the method may further include selecting, from the PLMN list, another PLMN and a corresponding RAT type thereof, if the selected RAT type corresponding to the PLMN is not supported by the mobile terminal; and performing network selection.

In some embodiments, the method may further include selecting a network according to a duplex mode which is supported by the mobile terminal, if the selected PLMN and the selected RAT type are not contained in the comparison table.

In some embodiments, selecting a network according to a duplex mode which is supported by the mobile terminal may include:
 if only one duplex mode is supported by the mobile terminal, selecting a network according to the duplex mode supported by the mobile terminal; and
 if more than one duplex mode are supported by the mobile terminal, selecting a network according to the more than one duplex mode supported by the mobile terminal one by one.

In some embodiments, the method may further include: selecting, from the PLMN list, another PLMN and a corresponding RAT type thereof, if the network selection fails; and performing network selection.

In some embodiments, selecting a network according to a duplex mode which corresponds to the selected PLMN and the selected RAT type may include:

if only one duplex mode which corresponds to the selected PLMN and the selected RAT type is contained in the comparison table, selecting a network according to the duplex mode; and if more than one duplex mode which correspond to the selected PLMN and the selected RAT type are contained in the comparison table, selecting a network according to the more than one duplex mode one by one.

In some embodiments, if the mobile terminal does not select, from the PLMN list, a PLMN and a corresponding RAT type thereof, the mobile terminal may select a network according to duplex modes and RAT types supported by the mobile terminal one by one.

In some embodiments, the method may further include updating the comparison table based on a network selection result.

In some embodiments, updating the comparison table based on a network selection result may include: adding the selected PLMN and RAT type, and the duplex mode corresponding to the selected PLMN and RAT type into the comparison table, after a network is selected successfully according to the selected PLMN and RAT type which are not contained in the comparison table.

In some embodiments, the method may further include:
searching a PLMN according to a RAT type and a duplex mode supported by the mobile terminal; and
adding the PLMN, and a RAT type and a duplex mode which correspond to the PLMN into the comparison table, if the PLMN is not contained in the comparison table.

In some embodiments, a PLMN may be selected from a PLMN list in a descending order of priority.

In some embodiments, the PLMN list is stored in a storing module of the mobile terminal, and the PLMN list may include a Registered Public Land Mobile Network (RPLMN) list, a Home Public Land Mobile Network (HPLMN) list and a Visited Public Land Mobile Network (VPLMN) list, wherein the RPLMN list has the highest priority, and the VPLMN list has the lowest priority.

In some embodiments, the PLMN list and the comparison table are stored in a storing module of the mobile terminal, wherein the storing module may include a Subscriber Identity Module (SIM) card, or a Nonvolatile Memory (NVM).

In some embodiments, a PLMN number, a RAT type corresponding to the PLMN, and a duplex mode corresponding to the PLMN and the RAT type contained in the comparison table may be predetermined according to a mobile terminal's type and practical applications.

In some embodiments, the RAT type may include Evolved UMTS Terristrial Access Network (E-UTRAN) and UMTS Terristrial Access Network (UTRAN).

In some embodiments, the duplex mode may include Time Division Duplex (TDD) mode or Frequency Division Duplex (FDD) mode.

In one embodiment, a mobile terminal is provided, which may include:
a selecting unit, adapted for selecting, from a Public Land Mobile Network (PLMN) list of a mobile terminal, a PLMN and a corresponding Radio Access Technology (RAT) type, wherein the PLMN list contains a PLMN number and a RAT type corresponding to the PLMN;
a network selection unit, adapted for performing network selection, wherein the network selection unit comprises a searching unit and a first network selection sub-unit,
wherein the searching unit is adapted for searching in a comparison table if the selected RAT type corresponding to the PLMN is supported by the mobile terminal, wherein the comparison table contains a PLMN number, a RAT type corresponding to the PLMN, and a duplex mode corresponding to the PLMN and the RAT type; and
the first network selection sub-unit is adapted for selecting a network according to a duplex mode which corresponds to the selected PLMN and the selected RAT type, if the selected PLMN and the selected RAT type are contained in the comparison table.

In some embodiments, the selecting unit is further adapted for selecting, from the PLMN list, another PLMN and a corresponding RAT type thereof, if the selected RAT type corresponding to the PLMN is not supported by the mobile terminal.

In some embodiments, the network selection unit further includes a second network selection sub-unit, which is adapted for selecting a network according to a duplex mode which is supported by the mobile terminal, if the selected PLMN and the selected RAT type are not contained in the comparison table.

In some embodiments, the selecting unit is further adapted for selecting, from the PLMN list, another PLMN and a corresponding RAT type thereof, if the network selection fails.

In some embodiments, the mobile terminal further includes an updating unit, adapted for updating the comparison table based on a network selection result.

In some embodiments, the updating unit may include:
a first updating sub-unit, adapted for adding the selected PLMN and RAT type, and the duplex mode corresponding to the selected PLMN and RAT type into the comparison table, after a network is selected successfully according to the selected PLMN and RAT type which are not contained in the comparison table; and
a second updating sub-unit, adapted for searching a PLMN according to a RAT type and a duplex mode supported by the mobile terminal; and adding the PLMN, and a RAT type and a duplex mode which correspond to the PLMN into the comparison table, if the PLMN is not contained in the comparison table.

In some embodiments, the PLMN list and the comparison table are stored in a storing module of the mobile terminal, wherein the storing module may include a Subscriber Identity Module (SIM) card, or a Nonvolatile Memory (NVM).

In the event that a multi-mode mobile terminal supporting multiple duplex modes is powered on, roaming, or lost in network coverage, the mobile terminal can determine a duplex mode in a comparison table after it selects a PLMN and a corresponding RAT type. Then the mobile terminal may select a network according to the determined duplex mode, thereby the speed of network selection is increased greatly, network resource is saved, and power consumption is lowered.

In addition, a comparison table may be updated according to a network selection result, so that the updated comparison table may be used for reference during next network selection.

DETAILED DESCRIPTION

Figure 1:
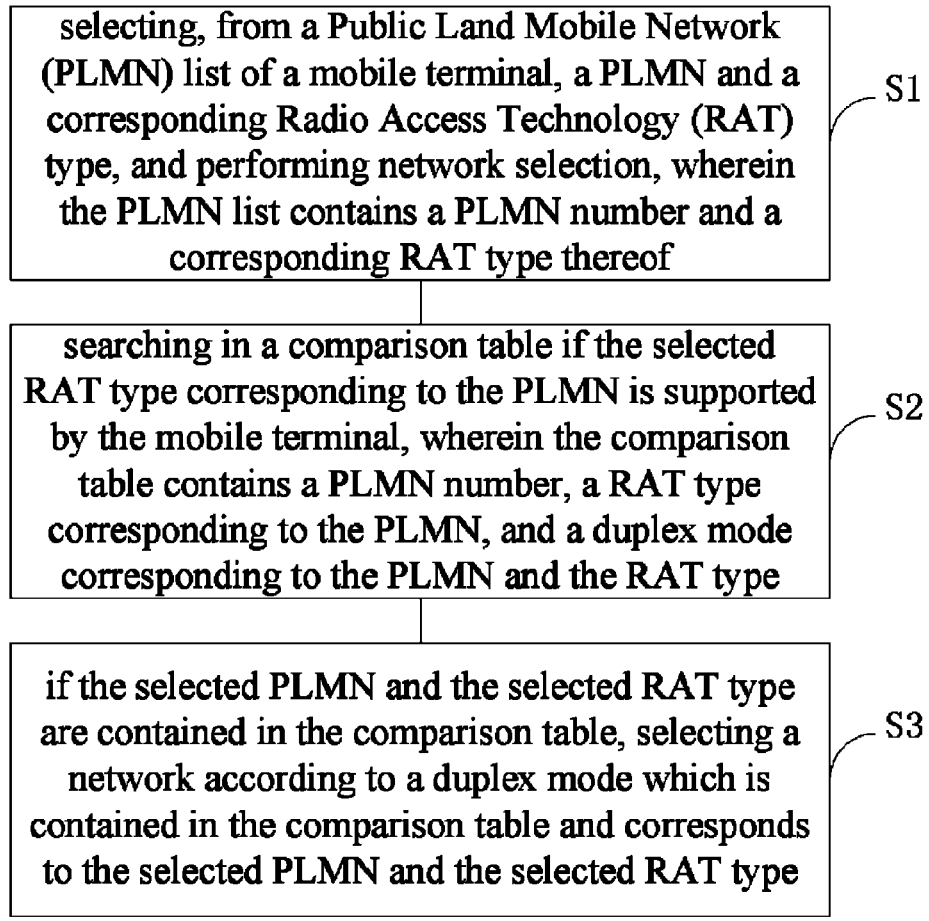
FIG. 1 schematically illustrates a flow chart of a method for selecting a network according to one embodiment of the present disclosure.

To solve problems described above, one embodiment of the present disclosure provides a network selection method. Referring to FIG. 1, the method may include:

S1, selecting, from a Public Land Mobile Network (PLMN) list of a mobile terminal, a PLMN and a corresponding Radio Access Technology (RAT) type, and performing network selection, wherein the PLMN list contains a PLMN number and a corresponding RAT type thereof;

Wherein the network selection may include:

S2, searching in a comparison table if the selected RAT type corresponding to the PLMN is supported by the mobile terminal, wherein the comparison table contains a PLMN number, a RAT type corresponding to the PLMN, and a duplex mode corresponding to the PLMN and the RAT type;

S3, if the selected PLMN and the selected RAT type are contained in the comparison table, selecting a network according to a duplex mode which is contained in the comparison table and corresponds to the selected PLMN and the selected RAT type.

First, the mobile terminal may select a PLMN and a RAT type from a PLMN list, such as, a PLMN having the highest priority and a corresponding RAT type thereof. Then the mobile terminal may search for a corresponding duplex mode from a comparison table. The selected duplex mode may be used to perform network selection. If there is no corresponding duplex mode contained in the comparison table, multiple duplex modes which are supported by the mobile terminal may be tried successively to perform network selection. Meanwhile, after the mobile terminal selects a network, the comparison table may be updated according to the selected network, so that the updated comparison table may be used for reference for a next network selection.

In order to clarify the objects, characteristics and advantages of the disclosure, the embodiments of the present disclosure will be described in detail in conjunction with the accompanying drawings.

The disclosure will be described with reference to certain embodiments. It will be understood by those skilled in the art that various changes may be made without departing from the spirit or scope of the disclosure. Accordingly, the present disclosure is not limited to the embodiments disclosed.

Figure 2:
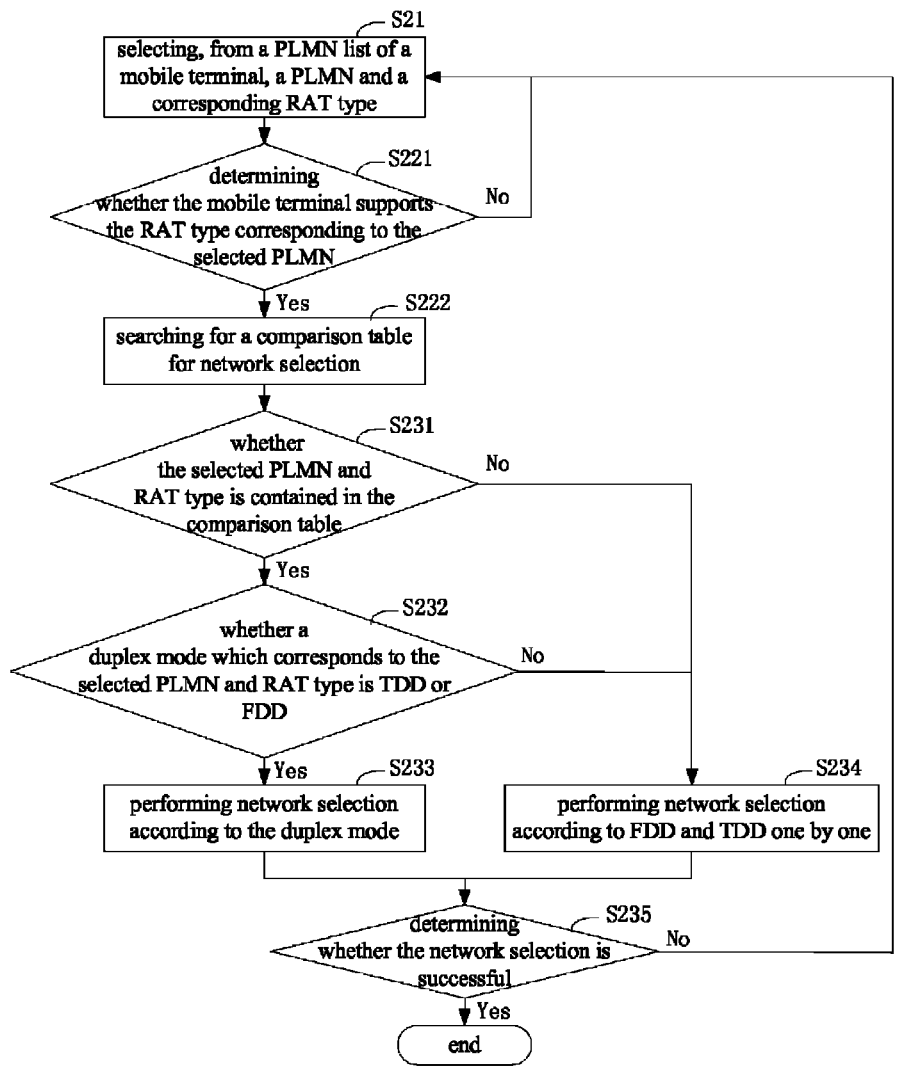
FIG. 2 schematically illustrates a flow chart of a method for selecting a network according to one embodiment of the present disclosure.

A dual-mode mobile terminal which supports both TD-SCDMA (simply referred to as TD) mode and WCDMA (simply referred to as W) mode is taken as an example to describe a network selection method. FIG. 2 schematically illustrates a flow chart of a method for selecting a network according to one embodiment of the present disclosure. First, in S21, selecting, from a PLMN list of a mobile terminal, a PLMN and a corresponding RAT type.

Generally, a plurality of PLMN lists may be stored in one of a SIM card, a USIM card and a NVM of the mobile terminal The PLMN lists may include, such as a Registered Public Land Mobile Network (RPLMN) list, a Home Public Land Mobile Network (HPLMN) list and a Visited Public Land Mobile Network (VPLMN) list, where the RPLMN list contains a last registered network. In some embodiments, the RPLMN list has the highest priority, and the VPLMN list has the lowest priority. In some embodiments, if the mobile terminal has registered with a TD network, a PLMN number of the TD network is contained in the RPLMN list. In some embodiments, for a TD terminal roaming in a W network, a PLMN number of the TD network is contained in the HPLMN list, and a PLMN number of the W network is contained in the VPLMN list.

Each item in a PLMN list may further contain a RAT type corresponding to a PLMN. For example, for a TD-SCDMA network or a WCDMA network, its corresponding RAT type is UTRAN; and, for a TD-LTE network, its corresponding RAT type is E-UTRAN.

The PLMN may be selected in a descending order of priority, according to a predetermined rule, or a user's instruction. If network selection is set to be performed automatically (auto-selection), the mobile terminal may select a PLMN having the highest priority and a corresponding RAT type thereof. If network selection is set to be performed non-automatically (manual-selection), the mobile terminal may select a PLMN and a corresponding RAT type thereof according to a user's instruction. For example, for a TD terminal roaming in a W network, if an auto-selection is set when the TD terminal is powered on, the TD terminal may select, from a RPLMN which has the highest priority, a PLMN and a corresponding RAT type thereof, or may select a PLMN and a corresponding RAT type thereof according to a predetermined rule. And if a manual-selection is set when the mobile terminal is powered on, the user may select a PLMN number of the TD network presented in a user interface of the mobile terminal, or select a PLMN number of the W network.

After a PLMN and a corresponding RAT type thereof is determined, network selection is performed, which may include:

S221, determining whether the mobile terminal supports the RAT type corresponding to the selected PLMN. Before searching for a comparison table, it is required to determine whether the mobile terminal supports the RAT type corresponding to the selected PLMN. A plurality of RAT types supported by a mobile terminal are stored in a NVM of the mobile terminal before being delivered from the factory. First, the mobile terminal may read, from a PLMN list, a RAT type corresponding to the selected PLMN. Then the selected RAT type is compared with the plurality of RAT types stored in the NVM. If the selected RAT type is same with one of the stored RAT types, it is determined that the mobile terminal supports the RAT type corresponding to the selected PLMN. Otherwise, it is determined that the mobile terminal does not support the RAT type corresponding to the selected PLMN.

If the determination in S221 is YES, namely, the mobile terminal supports the RAT type corresponding to the selected PLMN, the method goes to S222, searching for a comparison table for network selection. The comparison table may include a PLMN number, a RAT type corresponding to the PLMN, and a duplex mode corresponding to the PLMN number and the RAT type. The comparison table may be stored in a SIM card or a NVM of the mobile terminal. When the comparison table is stored in the SIM card, a protocol of the SIM card needs to be re-configured accordingly. By contrast, it is implementable and feasible that the comparison table is stored in the NVM. Specifically, each item of the comparison table may be composed of three fields, including a first field which represents a PLMN number, a second field which represents a RAT type, and a third field which represents a duplex mode. The number of the items in the comparison table is not unchangeable, which may be set as required. In some embodiments, the comparison table may be empty, or may be predetermined to contain a plurality of items according to a mobile terminal's type and practical applications. As for the dual-mode mobile terminal which supports both TD- SCDMA and WCDMA in this embodiment, if the TD network is predominant, the comparison table may be predetermined to be: in the first item, the first field is a PLMN number of the TD network, the second field is UTRAN, and the third field is TDD; and, in the second item, the first field is a PLMN number of the W network, the second field is UTRAN, and the third field is FDD. If the modes supported by the mobile terminal changes, the comparison table may be set according to network coverage.

If the determination in S221 is NO, namely, the mobile terminal does not support the RAT type corresponding to the selected PLMN, the method goes back to S21, selecting again, from the PLMN list of the mobile terminal, a PLMN and a corresponding RAT type. For example, if the mobile terminal performs network selection manually, and a PLMN of TD-LTE network is selected, the mobile terminal needs to select another PLMN ant a corresponding RAT type, because the mobile terminal only supports TD-SCDMA and WCDMA, and can not support the RAT type corresponding to the TD-LTE. If the mobile terminal performs network selection automatically, and a PLMN and a corresponding RAT type is selected according to a predetermined rule, the mobile terminal may select another PLMN if the selected RAT type is not supported by the mobile terminal.

S231 is performed after S222. In S231, whether the selected PLMN and RAT type is contained in the comparison table is determined. Specifically, S231 may be performed by searching in the comparison table for a PLMN number matching the selected PLMN number.

If the determination in S231 is YES, namely, the selected PLMN and RAT type are contained in the comparison table, the method goes to S232. In S232, determine whether a duplex mode which corresponds to the selected PLMN and RAT type is one of the duplex modes supported by the mobile terminal. In this embodiment, the duplex modes contained in the comparison table include TDD and FDD, which are supported by the mobile terminal. That is, in S232, determine whether a duplex mode which corresponds to the selected PLMN and RAT type is TDD or FDD.

If the determination in S232 is YES, the method goes to S233. In S233, performing network selection according to the duplex mode. In this embodiment, the duplex modes contained in the comparison table include TDD and FDD.

If the determination in S231 or S232 is NO, namely, the selected PLMN and RAT type is not contained in the comparison table, or the duplex mode corresponding to the selected PLMN and RAT type include all the duplex modes (namely, both TDD and FDD) supported by the mobile terminal, the method goes to S234. In S234, perform network selection according to FDD and TDD one by one. For example, if the mobile terminal is powered on for the first time, and the comparison table is empty, the mobile terminal may select a network according to FDD or TDD, respectively. For a TD terminal roaming in a W network, the TD terminal may select a network according to TDD preferentially. For a W terminal roaming in a TD network, the W terminal may select a network according to FDD preferentially. Taking a TD terminal roaming in a W network as an example, the step S234 may include: the TD terminal selecting a network automatically according to TDD mode; if the selection fails, the TD terminal re-selecting a network according to FDD mode. After the mobile terminal selects a network to register with the network, there is a situation that the registration may fail, which means a failure in network selection that is specified in the $3^{rd}$ Generation Partner Project (3GPP). In this case, the method goes back to S21, re-selecting a PLMN and a corresponding RAT type, and performing network selection again.

In S235, whether the network selection is successful is determined.

If the determination in S235 is NO, namely, the mobile terminal fails to select a network, the method goes back to S21, re-selecting a PLMN and a corresponding RAT type, and performing network selection again.

If the determination in S235 is YES, namely, the mobile terminal succeeds in selecting a network, the method is finished. After a network is selected successfully, the mobile terminal may conduct a voice service, a data service, etc. When the mobile terminal is in idle state or is conducing services, it may start to re-select a network if network selection failure occurs due to power on, power off, lose of coverage, or roaming.

Figure 3:
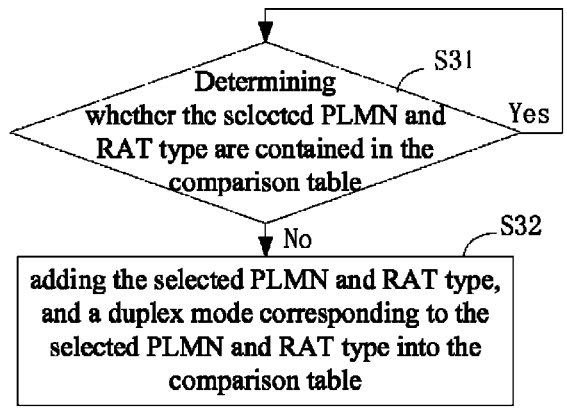
FIG. 3 schematically illustrates a flow chart of a method for updating a comparison table according to one embodiment of the present disclosure.

To make the method provided in embodiments of the present disclosure more convenient, the method may further include updating a comparison table. Updating a comparison table is to record, in the comparison table, a PLMN, a RAT type and a duplex mode which has been successfully used to select a network, so that the updated comparison table may be used for reference during next network selection, thereby improving accuracy and efficiency of network selection. FIG. 3 schematically illustrates a flow chart of a method for updating a comparison table according to one embodiment of the present disclosure. The method may include:

S31, determining whether the selected PLMN and RAT type are contained in the comparison table.

If NO, the method goes to S32, adding the selected PLMN and RAT type, and a duplex mode corresponding to the selected PLMN and RAT type into the comparison table. If YES, the method goes back to S31.

After a network is selected successfully according to the method illustrated in FIG. 2, a comparison table may be updated. First, it is determined whether or not the selected PLMN and RAT type are contained in the comparison table. If NO, the selected PLMN and RAT type, and a duplex mode corresponding to the selected PLMN and RAT type are added into the comparison table.

Further, the mobile terminal may search for a PLMN timely when being used. Therefore, the comparison table may be updated if the mobile terminal searches out a new PLMN. In this case, updating a comparison table may include: determining whether the new PLMN is contained in the comparison table; if NO, adding the new PLMN, and a RAT type and a duplex mode corresponding to the new PLMN into the comparison table.

Figure 4:
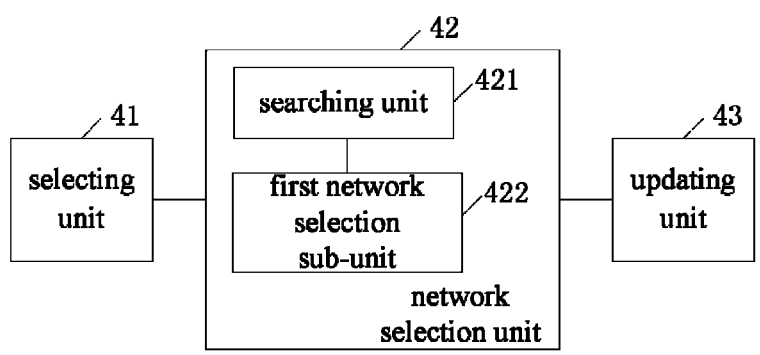
FIG. 4 schematically illustrates a mobile terminal according to one embodiment of the present disclosure.

FIG. 4 schematically illustrates a mobile terminal according to one embodiment of the present disclosure. The mobile terminal may include: a selecting unit 41, adapted for selecting, from a PLMN list, a PLMN and a corresponding RAT type, wherein the PLMN list may include a PLMN number, and a RAT type corresponding to the PLMN; and a network selection unit 42, adapted for performing network selection.

In some embodiments, the network selection unit 42 may include a searching unit 421 and a first network selection sub-unit 422. The searching unit 421 is adapted for searching in a comparison table if the RAT type corresponding to the selected PLMN is supported by the mobile terminal The comparison table may include a PLMN number, a RAT type corresponding to the PLMN, and a duplex mode corresponding to the PLMN and the RAT type. The first network selection sub-unit 422 is adapted for performing network selection according to a duplex mode corresponding to the selected PLMN and the RAT type, if the selected PLMN and the RAT type are contained in the comparison table.

Further, the selecting unit 41 is adapted for selecting, from the PLMN list, another PLMN and a corresponding RAT type thereof, if the RAT type corresponding to the selected PLMN is not supported by the mobile terminal. The selecting unit 41 is further adapted for selecting, from the PLMN list, another PLMN and a corresponding RAT type thereof, if the network selection fails.

In some embodiments, the network selection unit 42 may further include a second network selection sub-unit (not shown), which is adapted for performing network selection according to a duplex mode supported by the mobile terminal, if the selected PLMN and the RAT type are not contained in the comparison table.

In some embodiments, the mobile terminal further include a updating unit 43, which is adapted for updating a comparison table based on a network selection result. The updating unit 43 may include a first updating sub-unit and a second updating sub-unit (not shown). The first updating sub-unit is adapted for adding the selected PLMN and RAT type, and the duplex mode corresponding to the selected PLMN and RAT type into the comparison table, after a network is selected successfully according to the selected PLMN and RAT type which are not contained in the comparison table. The second updating sub-unit is adapted for searching a PLMN according to a RAT type and a duplex mode supported by the mobile terminal; and adding the PLMN, and a RAT type and a duplex mode which correspond to the PLMN into the comparison table, if the PLMN is not contained in the comparison table.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

We claim:

1. A method for selecting a network for use with a mobile terminal comprising a processor and a memory in which a Public Land Mobile Network (PLMN) list and a comparison table are stored, the PLMN list comprising a PLMN number and a Radio Access Technology (RAT) type corresponding to the PLMN and the comparison table comprising a PLMN number, a RAT type corresponding to the PLMN, and a duplex mode corresponding to the PLMN and the RAT type, the method comprising:
    selecting, with the processor, from the PLMN list, a PLMN and a corresponding RAT type from the PLMN list, and performing, with the processor, a network selection;
    updating, with the processor, the comparison table based on a network selection result; and
    connecting the mobile terminal to the selected PLMN and transmitting data via the selected PLMN;
    wherein the performing the network selection comprises:
        determining whether the mobile terminal supports the RAT type corresponding to the selected PLMN;
        if the mobile terminal supports the RAT type corresponding to the selected PLMN, searching the comparison table to determine whether the selected PLMN and the selected RAT type are contained in the comparison table;
        if the selected PLMN and the selected RAT type are contained in the comparison table, selecting a network according to a duplex mode which corresponds to the selected PLMN and the selected RAT type to camp on a cell in the network; and
        if the selected PLMN and the selected RAT type are not contained in the comparison table, selecting a network according to a duplex mode that is supported by the mobile terminal to camp on a cell in the network; and
        wherein the comparison table enables the network to be selected based on information on the duplex mode.

2. The method according to claim 1, wherein the performing the network selection comprises:
    selecting, from the PLMN list, another PLMN and a corresponding RAT type thereof, if the selected RAT type corresponding to the PLMN is not supported by the mobile terminal; and performing network selection.

3. The method according to claim 1, wherein selecting a network according to a duplex mode which is supported by the mobile terminal comprises:
    if only one duplex mode is supported by the mobile terminal, selecting a network according to the duplex mode supported by the mobile terminal; and
    if more than one duplex mode are supported by the mobile terminal, selecting a network according to the more than one duplex mode supported by the mobile terminal one by one.

4. The method according to claim 1, further comprising:
    selecting, with the processor, another PLMN and a corresponding RAT type thereof from the PLMN list, if the network selection fails; and performing network selection.

5. The method according to claim 1, wherein selecting a network according to a duplex mode which corresponds to the selected PLMN and the selected RAT type comprises:
    if only one duplex mode which corresponds to the selected PLMN and the selected RAT type is contained in the comparison table, selecting a network according to the duplex mode; and
    if more than one duplex mode which correspond to the selected PLMN and the selected RAT type are contained in the comparison table, selecting a network according to the more than one duplex mode one by one.

6. The method according to claim 1, wherein updating the comparison table based on a network selection result comprises:
    adding the selected PLMN and RAT type, and the duplex mode corresponding to the selected PLMN and RAT type into the comparison table, after a network is selected successfully according to the selected PLMN and RAT type which are not contained in the comparison table.

7. The method according to claim 1, wherein updating the comparison table based on network selection result comprises:
    searching a PLMN according to a RAT type and a duplex mode supported by the mobile terminal; and
    adding the PLMN, and a RAT type and a duplex mode which correspond to the PLMN into the comparison table, if the PLMN is not contained in the comparison table.

8. The method according to claim 1, wherein a PLMN is selected from a PLMN list in a descending order of priority.

9. The method according to claim 8, wherein the PLMN list is stored in a storing module of the mobile terminal, and the PLMN list comprises a Registered Public Land Mobile Network (RPLMN) list, a Home Public Land Mobile Network (HPLMN) list and a Visited Public Land Mobile Network (VPLMN) list, wherein the RPLMN list has the highest priority, and the VPLMN list has the lowest priority.

10. The method according to claim 1, wherein the memory comprises a Subscriber Identity Module (SIM) card, a Universal Subscriber Identity Module (USIM) card, or a Non-volatile Memory (NVM).

11. The method according to claim 1, wherein a PLMN number, a RAT type corresponding to the PLMN, and a duplex mode corresponding to the PLMN and the RAT type contained in the comparison table are predetermined according to a mobile terminal's type and practical applications.

12. A mobile terminal, comprising:
a memory storing a Public Land Mobile Network (PLMN) list comprising a PLMN number and a Radio Access Technology (RAT) type corresponding to the PLMN and a comparison table comprising a PLMN number, a RAT type corresponding to the PLMN, and a duplex mode corresponding to the PLMN and the RAT type;
a selecting unit structured to select, from the PLMN list, a PLMN and the corresponding RAT type;
a network selection unit structured to perform a network selection, wherein the network selection unit comprises a searching unit, a first network selection sub-unit, and a second network selection sub-unit, and
an updating unit structured to update the comparison table based on a network selection result, wherein the comparison table enables the network to be selected based on information on the duplex mode;
wherein the searching unit is structured to, if the selected RAT type corresponding to the PLMN is supported by the mobile terminal, search in the comparison table to determine whether the selected PLMN and the selected RAT are contained in the comparison table;
the first network selection sub-unit is structured to, if the selected PLMN and the selected RAT type are contained in the comparison table, select a network according to a duplex mode which corresponds to the selected PLMN and the selected RAT type to camp on a cell in the network; and
the second network selection unit is structured to, if the selected PLMN and the selected RAT type are not contained in the comparison table, selected a network according to a duplex mode that is supported by the mobile terminal to camp on a cell in the network; and
wherein the mobile terminal is structured to connect to the selected PLMN and transmit data via the selected PLMN.

13. The mobile terminal according to claim 12, wherein the selecting unit is further structured to select, from the PLMN list, another PLMN and a corresponding RAT type thereof, if the selected RAT type corresponding to the PLMN is not supported by the mobile terminal.

14. The mobile terminal according to claim 12, wherein the selecting unit is further structured to select, from the PLMN list, another PLMN and a corresponding RAT type thereof, if the network selection fails.

15. The mobile terminal according to claim 12, wherein the updating unit comprises:
a first updating sub-unit structured to add the selected PLMN and RAT type, and the duplex mode corresponding to the selected PLMN and RAT type into the comparison table, after a network is selected successfully according to the selected PLMN and RAT type which are not contained in the comparison table; and
a second updating sub-unit structured to search a PLMN according to a RAT type and a duplex mode supported by the mobile terminal; and adding the PLMN, and a RAT type and a duplex mode which correspond to the PLMN into the comparison table, if the PLMN is not contained in the comparison table.

16. The mobile terminal according to claim 12, wherein the memory comprises a Subscriber Identity Module (SIM) card, a Universal Subscriber Identity Module (USIM) card, or a Nonvolatile Memory (NVM).

17. A non-transitory computer-readable medium for use with a network and a mobile terminal comprising a processor and a memory in which a Public Land Mobile Network (PLMN) list and a comparison table are stored, the PLMN list comprising a PLMN number and a Radio Access Technology (RAT) type corresponding to the PLMN and the comparison table comprising a PLMN number, a RAT type corresponding to the PLMN, and a duplex mode corresponding to the PLMN and the RAT type, the non-transitory computer-readable medium comprising computer-executable instructions that, when executed by the mobile terminal, cause the mobile terminal to perform:
selecting, with the processor, a PLMN and a corresponding RAT type from the PLMN list, and performing, with the processor, a network selection;
performing, with the processor, a network selection;
updating, with the processor, the comparison table based on a network selection result; and
connecting the mobile terminal to the selected PLMN and transmitting data via the selected PLMN;
wherein the performing the network selection comprises:
determining whether the mobile terminal supports the RAT type corresponding to the selected PLMN;
if the mobile terminal supports the RAT type corresponding to the selected PLMN, searching the comparison table to determine whether the selected PLMN and the selected RAT type are contained in the comparison table;
if the selected PLMN and the selected RAT type are contained in the comparison table, selecting a network according to a duplex mode which corresponds to the selected PLMN and the selected RAT type to camp on a cell in the network; and
if the selected PLMN and the selected RAT type are not contained in the comparison table, selecting a network according to a duplex mode that is supported by the mobile terminal to camp on a cell in the network; and
wherein the comparison table enables the network to be selected based on information on the duplex mode.

* * * * *